US010037703B2

(12) United States Patent
Kim et al.

(10) Patent No.: US 10,037,703 B2
(45) Date of Patent: Jul. 31, 2018

(54) METHOD FOR COUPLING FLIGHT PLAN AND FLIGHT PATH USING ADS-B INFORMATION

(71) Applicant: KOREA AEROSPACE RESEARCH INSTITUTE, Daejeon (KR)

(72) Inventors: Hyoun Kyoung Kim, Daejeon (KR); Dae Keun Jeon, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 15/531,378

(22) PCT Filed: Nov. 28, 2014

(86) PCT No.: PCT/KR2014/011550
§ 371 (c)(1),
(2) Date: May 26, 2017

(87) PCT Pub. No.: WO2016/085012
PCT Pub. Date: Jun. 2, 2016

(65) Prior Publication Data

US 2017/0330465 A1 Nov. 16, 2017

(30) Foreign Application Priority Data

Nov. 27, 2014 (KR) ........................ 10-2014-0167140

(51) Int. Cl.
*G01S 13/93* (2006.01)
*G08G 5/00* (2006.01)

(52) U.S. Cl.
CPC ........... *G08G 5/003* (2013.01); *G08G 5/0013* (2013.01)

(58) Field of Classification Search
None
See application file for complete search history.

(56) References Cited

U.S. PATENT DOCUMENTS

2009/0201190 A1* 8/2009 Huthoefer ............... G01S 7/003 342/27
2009/0322588 A1 12/2009 Rolfe et al.
2010/0090882 A1 4/2010 Donovan
(Continued)

FOREIGN PATENT DOCUMENTS

KR 20090069412 A 7/2009
KR 20130049365 A 5/2013

OTHER PUBLICATIONS

Baud, O. et al., "Radar / ADS-B data fusion architecture for experimentation purpose," Proceedings of the 2006 9th International Conference on Information Fusion (Fusion 2006), Jul. 10, 2006, Florence, Italy, 6 pages.
(Continued)

*Primary Examiner* — Brent Swarthout
(74) *Attorney, Agent, or Firm* — McCoy Russell LLP

(57) ABSTRACT

The present invention relates to a method for coupling a flight plan and a flight path using ADS-B information, and more specifically to a method for coupling a flight plan and a flight path, wherein a flight data processing unit of an air traffic control system or an arrival management system separately and directly receives ADS-B information such that the received ADS-B information can be used for coupling a flight plan and a flight path of an aircraft.

4 Claims, 1 Drawing Sheet

(56) References Cited

U.S. PATENT DOCUMENTS

| | | | | |
|---|---|---|---|---|
| 2010/0315281 | A1* | 12/2010 | Askelson | G01S 7/003 342/30 |
| 2011/0118981 | A1* | 5/2011 | Chamlou | G08G 5/045 701/301 |
| 2011/0169684 | A1* | 7/2011 | Margolin | G01S 5/12 342/30 |
| 2012/0078495 | A1* | 3/2012 | Hamblin | G08G 5/0008 701/120 |
| 2012/0116614 | A1* | 5/2012 | Torres | G08G 5/0013 701/3 |
| 2015/0269846 | A1* | 9/2015 | De Prins | G08G 5/0043 701/120 |

OTHER PUBLICATIONS

ISA Korean Intellectual Property Office, International Search Report Issued in Application No. PCT/KR2014/011550, dated Aug. 26, 2015, WIPO, 4 pages.

* cited by examiner

METHOD FOR COUPLING FLIGHT PLAN AND FLIGHT PATH USING ADS-B INFORMATION

CROSS-REFERENCE TO RELATED APPLICATIONS

The present application is a U.S. National Phase of International Patent Application Serial No. PCT/KR2014/011550, entitled "METHOD FOR COUPLING FLIGHT PLAN AND FLIGHT PATH USING ADS-B INFORMATION," filed on Nov. 28, 2014. International Patent Application Serial No. PCT/KR2014/011550 claims priority to Korean Patent Application No. 10-2014-0167140, filed on Nov. 27, 2014. The entire contents of each of the above-cited applications are hereby incorporated by reference in their entirety for all purposes.

TECHNICAL FIELD

The present invention relates to a method for coupling a flight plan and a flight path using ADS-B information, and more specifically to a method for coupling a flight plan and a flight path, wherein a flight data processing unit of an air traffic control system or an arrival management system separately and directly receives ADS-B information such that the received ADS-B information can be used for coupling a flight plan and a flight path of an aircraft.

BACKGROUND ART

An air traffic control system is a system that provides air traffic control services for efficient and safe operation of an aircraft and serves to provide an air traffic controller with identification and display of an aircraft, display and distribution of flight plan information, and flight safety warning and process requirements of the air traffic controller.

As the technology related to the air traffic control system, a technology for an integrated information processing system for integrally processing radar-based surveillance information, flight data, and information processing for air traffic for aviation security strengthening has been disclosed in Korean Patent Laid-Open Publication No. 10-2013-0049365 (System for processing information of air traffic control).

On the other hand, for air traffic control, radar and next generation surveillance sensors have been widely used now. Among the next generation surveillance sensors, there is representatively automatic dependent surveillance-broadcast (ADS-B). The ADS-B serves to periodically broadcast an identification code, three-dimensional positions (latitude, longitude, altitude), a speed, and other information of an aircraft through a two-way wireless data link. Accordingly, the ADS-B may minimize restrictions (communication interruption due to a line of sight not ensured) of the aircraft, improve an air traffic control function, prevent a collision between aircrafts, and may very useful to allow aircrafts equipped with the ADS-B sensors to conduct mutual surveillance.

Due to the advantages described above, the technology related to ADS-B is being developed day by day, and the ADS-B information transmitted from the ADS-B sensor includes more and more information.

Although the ADS-B information is very useful, due to the configuration of the air traffic control system, the current air traffic control system does not utilize all the ADS-B information.

RELATED ART DOCUMENT

Patent Document

Korean Patent Laid-Open Publication No. 10-2013-0049365 ("System for processing information of air traffic control")

DISCLOSURE

Technical Problem

An object of the present invention is to provide a method for coupling a flight plan and a flight path using ADS-B information capable of utilizing ADS-B information not processed by a surveillance data processing unit and expanding coupling coverage of the flight plan and the flight path by allowing a flight data processing unit to receive the ADS-B information.

Another object of the present invention is to provide a method for coupling a flight plan and a flight path using ADS-B information capable of improving efficiency of arrival scheduling of aircrafts by performing coupling between a flight plan and a flight path using ADS-B information in advance.

Technical Solution

In one general aspect, a method for coupling a flight plan and a flight path using automatic dependent surveillance-broadcast (ADS-B) information in an air traffic control system for controlling traffic of an aircraft by including a surveillance data processing unit providing a system track that is a data estimating a position and a speed of the aircraft, a flight data processing unit processing and managing data related to the flight plan, and a display unit providing a control screen to an air traffic controller, the method includes: a) receiving, by the surveillance data processing unit, radar information and the ADS-B information (ADS-B track or ADS-B plot) and fusing the two information to generate the system track (S100); b) receiving, by the flight data processing unit, the system track from the surveillance data processing unit and receiving the ADS-B information separately from the surveillance data processing unit to couple the flight path and the pre-stored flight plan (S200); and c) receiving, by the display unit, the system track and the flight plan to display a current flight state (S300).

The step b) may include: b-1) coupling the flight plan with the system track using the secondary surveillance radar (SSR) code of the system track (flight plan-system track), if the flight data processing unit receives the system track including the SSR code (S210); b-2) coupling the flight plan with the ADS-B track using SSR code or Callsign of the ADS-B track (flight plan-ADS-B track), if the flight data processing unit receives the ADS-B track (S220); b-3) coupling the flight plan with the ADS-B plot using the Callsign of the ADS-B plot (flight plan-ADS-B plot), if the flight data processing unit receives the ADS-B plot (S230); and b-4) periodically determining, by the flight data processing unit, whether there is the flight path (the system track, the ADS-B track, or the ADS-B plot including the SSR code) corresponding to the flight plan for each aircraft and maintaining the coupling between the flight plan and the flight path if there is the flight path matching the flight path of the steps b-1 to b-3 (S240).

In the step b), a criterion on which the flight data processing unit determines the number of aircrafts to be one may be at least any one of a track number of the system track, a track number of the ADS-B track, the Callsign of the ADS-B plot or the ADS-B track, and 24-bit ICAO Address.

In the step c), the display unit may receive the ADS-B information separately from the surveillance data processing unit and further may includes the received ADS-B information in the system track and the flight plan to display the current flight state.

In another general aspect, a method for coupling a flight plan and a flight path using ADS-B information in an arrival management system performing scheduling of aircrafts so that the aircrafts arrive at a certain point within a flight information region (FIR) at regular intervals, the method includes: 1) receiving, by the surveillance data processing unit, the radar information and the ADS-B information and fusing the two information to generate a system track (S1000); 2) receiving, by the arrival management system, the system track from the surveillance data processing unit and receiving the flight plan from the flight data processing unit (S2000); 3) receiving, by the arrival management system, the ADS-B information separately from the surveillance data processing unit and coupling the flight path including the received ADS-B information and the received system track with the received flight plan (S3000); and 4) generating the flight path of the aircraft using the coupled flight plan and flight path to schedule an arrival interval between the aircrafts (S4000).

In the step 3), the ADS-B information may be received before the SSR code is issued and the Callsign included in the ADS-B information may be used to couple between the flight plan and the flight path.

Advantageous Effects

The method for coupling a flight plan and a flight path in the air traffic control system according to the present invention simultaneously transmits the ADS-B information to the surveillance data processing unit and the flight data processing unit, such that the flight data processing unit continuously couples the flight plan and the flight path in the aircraft equipped with the ADS-B sensor even when the surveillance data processing unit fails, thereby displaying the coupled flight plan and flight path on the control screen.

In addition, according to the related art, if there is the ADS-B information that is not fused into the system track by the surveillance data processing unit, there is no way to allow the flight data processing unit to use the corresponding ADS-B information. However, according to the present invention, the ADS-B information may be used as supplementary system track to expand the coverage in which the flight plan and the flight path are coupled.

In addition, according to the related art, all the ADS-B information is not included in the system track and therefore the flight data processing unit may not utilize all the ADS-B information. However, the present invention may utilize a lot of ADS-B information thoroughly.

Finally, the present invention utilized in the arrival management system may minimize the arrival delay by scheduling arrival intervals by checking the order of the aircrafts scheduled to arrive at the domestic FIR in advance.

BEST MODE

Hereinafter, a technical spirit of the present invention will be described in more detail with reference to the accompanying drawings.

The accompanying drawings are only examples shown in order to describe the technical idea of the present invention in more detail. Therefore, the technical idea of the present invention is not limited to shapes of the accompanying drawings.

Figure 1:
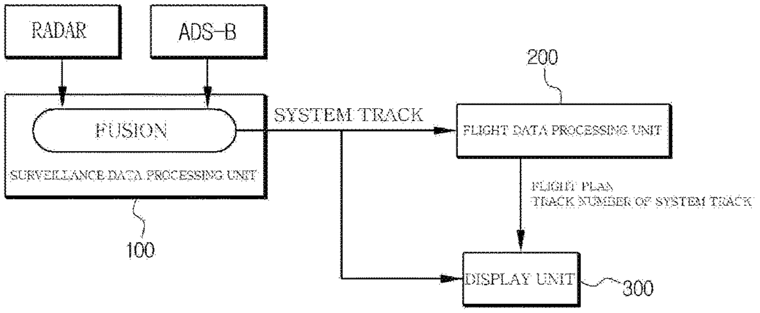
FIG. 1 Prior Art
FIG. 1 is a schematic view showing a method for coupling a flight plan and a flight path in the existing air traffic control system.

FIG. 1 is a schematic view showing a method for coupling a flight plan and a flight path in the existing air traffic control system.

To describe a method for coupling a flight plan and a flight path according to an exemplary embodiment of the present invention on the basis of a difference from the related art, the related art will be described with reference to FIG. 1.

An air traffic control system largely includes a surveillance data processing unit for providing a system track that is data estimating a position and a speed of an aircraft and a flight data processing unit 200 for processing and managing data related to a flight plan, and serves to control traffic of the aircraft as described above.

As shown in FIG. 1, a surveillance data processing unit 100 fuses radar information and ADS-B information to generate one system track and transmit the generated system track to the flight data processing unit 200.

Specifically, the ADS-B information transmitted from the ADS-B sensor of the aircraft is transmitted to an ADS-B terrestrial station by wireless communication, in which the data are transmitted to the surveillance data processing unit 100 of the air traffic control system using an ASTERIX Cat. 021 format that is the international standard data transmission format. The surveillance data processing unit 100 fuses radar information generated by allowing radar to sense an aircraft with the ADS-B information to estimate a position and speed of the aircraft and transmit the estimated position and speed to the flight data processing unit 200. In this way, a flight path data in which the position and speed of the aircraft are estimated by fusing ADS-B information and the radar information is called a system track.

Specifically, the existing ADS-B information is information in a form of 'ASTERIX Cat. 021 Ed 0.23' or 'ASTERIX Cat. 021 Ed 0.26' format, and includes only information at the present time. The ADS-B information is called an 'ADS-B plot' that includes positions (latitude, longitude, altitude) of the flight path, speed, acceleration, Callsign, or the like.

In addition, the flight data processing unit 200 couples the flight plan and the system track received from the surveillance data processing unit 100 to generate the flight plan-to-flight path coupling information, and relies on the system track data upon the coupling. That is, the flight data processing unit 200 couples the flight plan and the system track by comparing a secondary surveillance radar (SSR) code of the system track and the positions (latitude, longitude, altitude) of the flight path.

However, since the ADS-B plot which is the existing ADS-B information does not include the SSR code and an ADS-B track number used for coupling the flight plan and the system track, the flight data processing unit 200 can not couple the flight plan and the system track even if the surveillance data processing unit 100 fuses the ADS-B plot with the radar information to generate the system track.

Recently, the ADS-B system developed according to a new standard uses a format version beyond 'ASTERIX Cat. 021 Ed 1.0', and further includes connection information with the ADS-B plot at the previous time. The ADS-B information is called 'ADS-B track'. That is, the ADS-B track further includes an SSR code, an ADS-B track number, and the like in the ADS-B plot.

However, since the ADS-B information received by the surveillance data processing unit 100 primarily aims to provide the position information of the aircraft for the system track generation, it is optional whether to include the SSR code in the system track even if the ADS-B information is the ADS-B track including the SSR code. Also, the ADS-B track number is not included in the system track.

That is, typically, the ADS-B information is fused with the radar information by the surveillance data processing unit 100, is provided to the flight data processing unit 200 after being processed as the system track. It may cause that the ADS-B information not included in the system track can not be utilized.

Accordingly, as described above, the present invention proposes to solve the problem that although the ADS-B information includes more information as the ADS-B system comes a long way, the ADS-B information is not appropriately used for the coupling between the flight plan and the flight path of the aircraft by the flight data processing unit 200.

Figure 2:
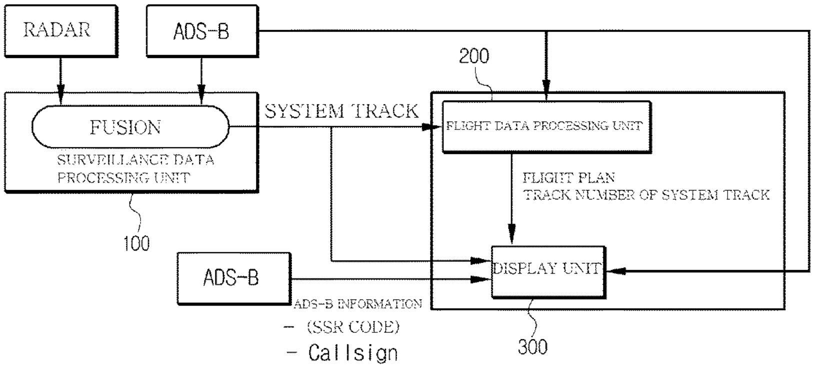
FIG. 2 is a schematic view showing a method for coupling a flight plan and a flight path in an air traffic control system according to an exemplary embodiment of the present invention.

FIG. 2 shows a schematic diagram of a method for coupling a flight plan and a flight path in an air traffic control system according to the present invention.

Referring to FIG. 2, the method for coupling a flight plan and a flight path in an air traffic control system according to the present invention includes step a (S100) of receiving, by the surveillance data processing unit 100, the radar information and the ADS-B information (ADS-B track or ADS-B plot) and fusing the two information to generate the system track, step b (S200) of receiving, by the flight data processing unit 200, the system track from the surveillance data processing unit 100 and receiving the ADS-B information separately from the surveillance data processing unit 100 to couple the flight path of the aircraft and the pre-stored flight plan, and step c (S300) of receiving, by the display unit 300, the system track and the flight plan to display the current flight state.

That is, in the air traffic control system, the present invention increases the utilization of the received ADS-B information by allowing the flight data processing unit 200 to directly receive the ADS-B information which has not passed through the surveillance data processing unit 100 in the step b. To this end, the existing flight data processing unit 200 receiving only the system track should be configured to receive even the ADS-B information.

At this time, the criterion on which the flight data processing unit 200 determines the number of aircrafts to be one may be at least any one of a track number of the system track, a track number of the ADS-B track, the Callsign of the ADS-B plot or the ADS-B track, and 24-bit ICAO Address. According to the related art, the number of aircrafts is determined to be one based on the track number of the system track, that is, when the track number of the system track matches. However, according to the present invention, since the flight data processing unit 200 separately receives the ADS-B information, as described above, the criterion for determining the number of aircrafts to be one further includes the track number of the ADS-B track, the Callsign of the ADS-B plot or the ADS-B track, and the 24-bit ICAO Address.

Further, the 24-bit ICAO Address is the International Civil Aviation Organization Address, such as a resident registration number of an aircraft equipped with ADS-B equipment, and is unique information for identifying an aircraft.

Meanwhile, the step b includes steps b-1 to b-4. In step b-1, if the flight data processing unit 200 receives the system track including the SSR code, the flight plan is coupled with the system track using the secondary surveillance radar (SSR) code of the system track (flight plan-system track) (S210). In step b-2, if the flight data processing unit 200 receives the ADS-B track, the flight plan is coupled with the ADS-B track using SSR code or Callsign of the ADS-B track (flight plan-ADS-B track) (S220). In step b-3, if the flight data processing unit 200 receives the ADS-B plot, the flight plan is coupled with the ADS-B plot using the Callsign of the ADS-B plot (flight plan-ADS-B plot) (S230). In the last step b-4, the flight data processing unit 200 periodically determines whether there is the flight path of the aircraft corresponding to the flight plan for each aircraft, that is, the system track, the ADS-B track, or the ADS-B plot including the SSR code and if there is the flight path matching the flight path of the steps b-1 to b-3, the coupling between the flight plan and the flight path is maintained (S240).

By the foregoing process, in the step b, the flight data processing unit 200 performs the coupling between the flight plan and the flight path. In the subsequent step c, the display unit 300 receives the flight plan and the track number of the system track from the flight data processing unit 200 and receives the system track from the surveillance data processing unit 100 to display the current flight path information of the aircraft on the control screen.

In this case, according to the present invention, the display unit 300 also receives the ADS-B information separately from the surveillance data processing unit 100 and further includes the received ADS-B information in the system track and the flight plan to be able to display the current flight state. In this case, the display unit 300 further receives the ADS-B track number or the Callsign from the flight data processing unit 200 together with the flight plan and the track number of the system track, and couples them with the received ADS-B information using them and displays them on the control screen. Accordingly, the air traffic controller can identify a large number of flight path information including the ADS-B information. At this time, the reason why the display unit 300 receives the ADS-B information separately from the flight data processing unit 200 is to prepare for the case where the ADS-B information is not properly coupled by the flight data processing unit 200.

As a result, the method for coupling a flight plan and a flight path in the air traffic control system according to the present invention simultaneously transmits the ADS-B information to the surveillance data processing unit 100 and the flight data processing unit 200, such that the flight data processing unit 200 continuously couples the flight plan and the flight path in the aircraft in which the ADS-B sensor is mounted even when the surveillance data processing unit 100 fails, thereby displaying the coupled flight plan and flight path on the control screen.

In addition, according to the related art, if there is the ADS-B information that is not fused into the system track by the surveillance data processing unit 100, there is no way to allow the flight data processing unit 200 to use the corresponding ADS-B information. However, according to the present invention, the ADS-B information may be supplemented in the system track to expand the coverage in which the flight plan and the flight path are coupled.

In addition, according to the related art, even though the SSR code is included in the system track and thus the flight data processing unit 200 couples the system track and the flight plan, since all the ADS-B information is not included in the system track (representatively, the ADS-B track number is not included in the system track), the flight data processing unit 200 can not utilize all the ADS-B information. However, the present invention can utilize a lot of ADS-B information.

Figure 3:
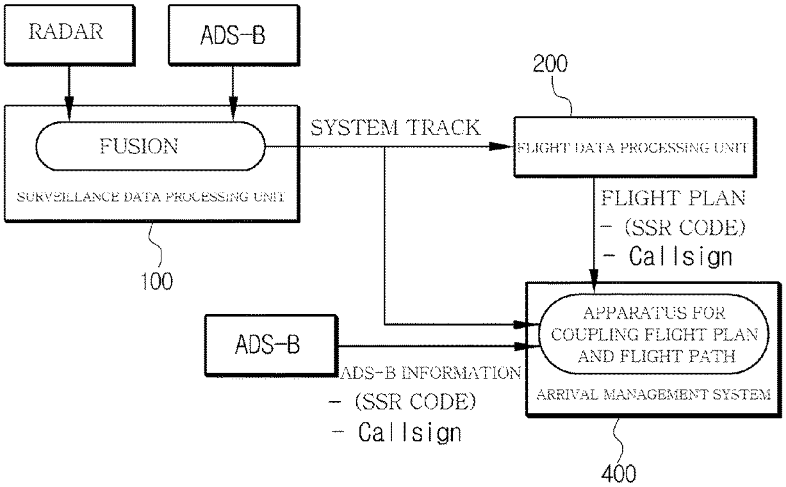
FIG. 3 is a schematic view showing a method for coupling a flight plan and a flight path in an arrival management system according to an exemplary embodiment of the present invention.

FIG. 3 is a schematic diagram showing a method for coupling a flight plan and a flight path in an arrival management system 400 according to the present invention. Hereinafter, the arrival management system 400 according to the present invention will be described with reference to FIG. 3.

The arrival management system 400 is a system for scheduling of aircrafts so that the aircrafts arrive at a certain point within a flight information region (FIR) at regular intervals. The existing arrival management system 400 receives the flight plan and the flight path information coupled by the flight data processing unit 200 to perform the aircraft arrival scheduling.

In this case, as described above, the SSR code needs to be included in the system track to generate flight plan and flight path coupling information. The SSR code is a code assigned at the moment that the aircraft enters the domestic FIR and means a code issued to identify the corresponding aircraft using the information collected by the secondary surveillance radar.

According to the present invention, the arrival management system 400 uses the ADS-B information to couple the flight plan and the flight path in advance, thereby more efficiently performing the aircraft arrival scheduling.

Specifically, according to the present invention, the method for coupling a flight plan and a flight path using ADS-B information in the arrival management system 400 includes a first step (S1000) of receiving, by the surveillance data processing unit 100, the radar information and the ADS-B information and fusing the two information to generate the system track, a second step (S2000) of receiving, by the arrival management system 400, the system track from the surveillance data processing unit 100 receiving the flight plan from the flight data processing unit 200, a third step (S3000) of receiving, by the arrival management system 400, the ADS-B information separately from the surveillance data processing unit 100 and coupling the flight path including the received ADS-B information and the received system track with the received flight plan, and a fourth step (S4000) of generating the flight path of the aircraft using the coupled flight plan and flight path to schedule the arrival interval between the aircrafts.

By using the fact that the SSR code is issued at the moment that the aircraft enters the domestic FIR but the Callsign is a data generated in advance when the flight plan is submitted (at the entry into the domestic FIR or 3 hours to five days before departure), the present invention receives the ADS-B information before the SSR code is issued and uses the Callsign included in the ADS-B information to couple between the flight plan and the flight path, thereby more quickly processing the coupling than the coupling using the existing SSR code. This assumes the situation that the ADS-B sensor senses data out of the domestic FIR coverage. The ADS-B information is gradually commercialized by installing ADS-B sensors around the world.

Accordingly, according to the present invention, the arrival management system 400 checks the order of the aircrafts to be arrived at the domestic FIR in advance to schedule the arrival interval, thereby minimizing the arrival delay.

The present invention is not limited to the above-mentioned exemplary embodiments, and may be variously applied, and may be variously modified without departing from the gist of the present invention claimed in the claims.

DETAILED DESCRIPTION OF MAIN ELEMENTS

100: Surveillance data processing unit
200: Flight data processing unit
300: Display unit
400: Arrival management system

The invention claimed is:

1. A method for coupling a flight plan and a flight path using automatic dependent surveillance-broadcast (ADS-B) information in an air traffic control system for controlling traffic of an aircraft by including a surveillance data processing unit providing a system track that is a data estimating a position and a speed of the aircraft, a flight data processing unit processing and managing data related to the flight plan, and a display unit providing a control screen to an air traffic controller, the method comprising:

a) receiving, by the surveillance data processing unit, radar information and the ADS-B information (ADS-B track or ADS-B plot) and fusing the two information to generate the system track including a secondary surveillance radar (SSR) code;

b) receiving, by the flight data processing unit, the system track from the surveillance data processing unit and receiving the ADS-B information (ADS-B track or ADS-B plot) separately from the surveillance data processing unit to couple the flight path of the aircraft included in the system track and the ADS-B information and the pre-stored flight plan; and c) receiving, by the display unit, the system track and the flight plan to display a current flight state, wherein the step b) includes:

b-1) coupling the flight plan with the system track using the SSR code of the system track (flight plan-system track), if the flight data processing unit receives the system track generated in the surveillance data processing unit;

b-2) coupling the flight plan with the ADS-B track using the SSR code or Callsign of the ADS-B track (flight plan-ADS-B track), if the flight data processing unit receives the ADS-B track separately from the surveillance data processing unit;

b-3) coupling the flight plan with the ADS-B plot using Callsign of the ADS-B plot (flight plan-ADS-B plot), if the flight data processing unit receives the ADS-B plot separately from the surveillance data processing unit; and b-4) periodically determining, by the flight data processing unit, whether there is the flight path corresponding to the flight plan for each aircraft, the flight path being included in at least one selected from the system track including the SSR code, the ADS-B track, and the ADS-B plot, and maintaining the coupling between the flight plan and the flight path if there is the flight path matching the flight path of the steps b-1 to b-3.

2. The method of claim 1, wherein in the step b), the flight data processing unit determines the number of aircrafts to be one when any one or more information is matched, the any one or more information being selected from a track number of the system track, a track number of the ADS-B track, the Callsign of the ADS-B plot or the ADS-B track, and 24-bit ICAO Address.

3. The method of claim 1, wherein in step c), the display unit receives the ADS-B information separately from the surveillance data processing unit and further includes the received ADS-B information in the system track and the flight plan to display the current flight state.

4. A method for coupling a flight plan and a flight path using ADS-B information in an arrival management system performing scheduling of aircrafts so that the aircrafts arrive at a certain point within a flight information region (FIR) at regular intervals, the method comprising:

1) receiving, by a surveillance data processing unit, radar information and the ADS-B information and fusing the two information to generate a system track;

2) receiving, by an arrival management system, the system track from the surveillance data processing unit and receiving the flight plan from the flight data processing unit;

3) receiving, by the arrival management system, the ADS-B information separately from the surveillance data processing unit and coupling the flight path including the received ADS-B information and the received system track with the received flight plan; and 4) generating the flight path of the aircraft using the coupled flight plan and flight path to schedule an arrival interval between the aircrafts, wherein in the step 3), the ADS-B information is received before an SSR code is issued and Callsign included in the ADS-B information is used to couple between the flight plan and the flight path.

* * * * *